Aug. 26, 1958   J. W. DONEGAN ET AL   2,849,018
VENT VALVE FOR RELIEVING PRESSURE
Filed Dec. 28, 1955   2 Sheets-Sheet 2
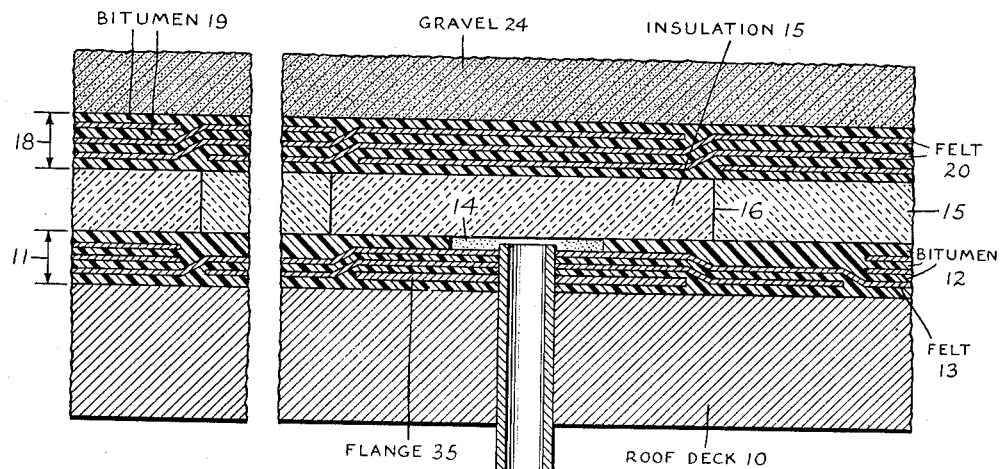
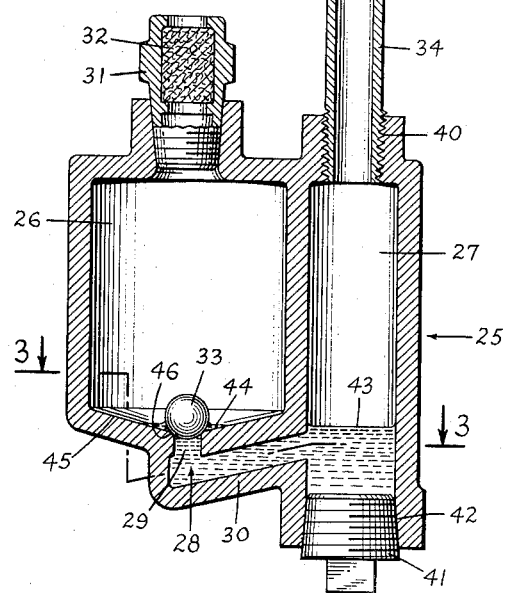
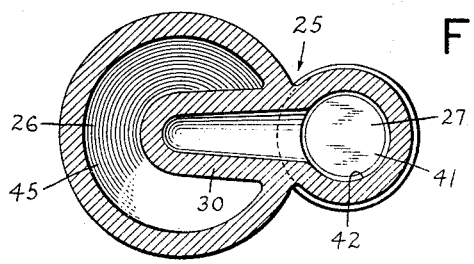
INVENTORS
JOSEPH W. DONEGAN
BENJAMIN S. PENLEY
BY
ATTORNEY

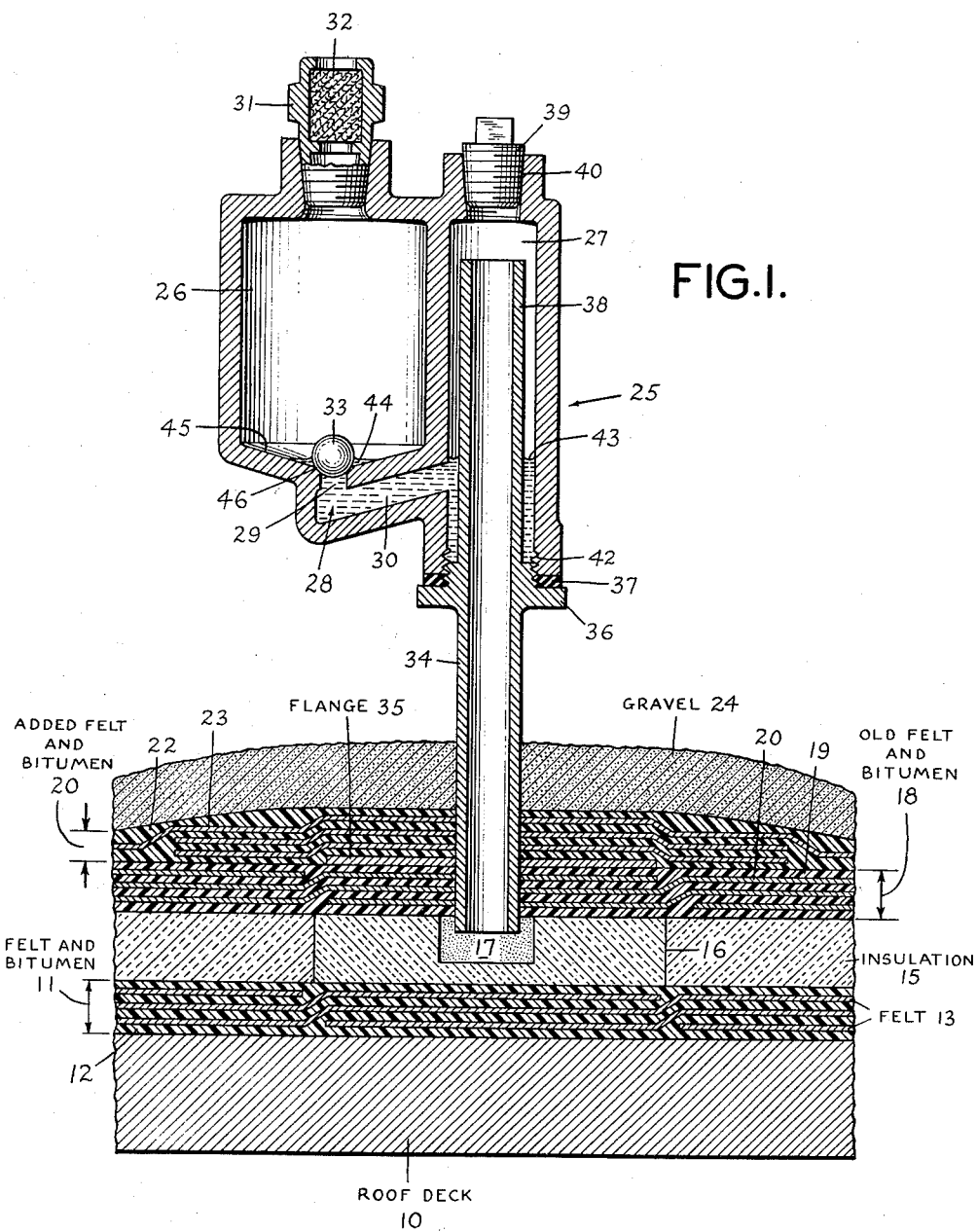

United States Patent Office 2,849,018
Patented Aug. 26, 1958

2,849,018

VENT VALVE FOR RELIEVING PRESSURE

Joseph W. Donegan, Leonia, and Benjamin S. Penley, Bergenfield, N. J., assignors to Allied Chemical Corporation, a corporation of New York Application December 28, 1955, Serial No. 555,966

6 Claims. (Cl. 137—251)

This invention relates to an improved vent valve adapted to relieve pressure generated within enclosures. It is particularly suitable for use in relieving pressure developed within roofs of the built-up or membrane type.

Many closed systems for reaction, storage, or transportation of fluids require operation at predetermined pressure. Typical of such systems are tanks or drums, wherein gas or vapor is stored at a particular pressure; pipe lines wherein gas is transported under desired pressure; or reaction vessels wherein the pressure of gases must be maintained constant, typically at or near atmospheric pressure. Other closed systems wherein pressure relief is a requisite for successful maintenance are those within built-up or membrane-type roofs. For the purpose of indicating operation of the vent valve of this invention in a complete embodiment, reference will be hereinafter made to the valve in combination with such a built-up or membrane type roof. It will be apparent to those skilled-in-the-art however that the valve is readily capable of use in connection with a wide variety of other systems.

In a typical membrane type roof, it is common practice to interpose between a vapor-tight load-supporting member or deck and the overlying vapor-tight membrane of roofing material, a cellular or otherwise porous material having insulating value. The porous insulating material contains air in quantity of upwards of 60% and often 80% or more of its superficial volume. The gases present therewithin, air and water vapor, expand when subjected to the relatively high temperatures encountered upon exposure of the roof to direct sunlight, especially so during the summer months. Consequently, there is created a substantial gas pressure in the volume included between the roof membrane and the deck which tends to destroy the bond between the membrane and supporting structure and to distort or rupture the membrane. Moisture adsorbed on the interior surfaces of the insulation originating from air or the insulation or adventitiously, tends to add to the volume of expanded gases within the heated insulation.

It is an object of this invention to provide a vent valve capable of relieving pressure in enclosures including e. g. tanks, drums, reaction vessels, pipelines, and built-up or membrane type roofs. It is a further object of this invention to provide a vent valve characterized by ability to vent at low actuating pressure and by a positive seal against gas return.

According to certain of its aspects, the vent valve assembly of this invention comprises a vertically extending expansion chamber having an opening in the upper portion thereof, within which may preferably be mounted an air-filter. The bottom of the expansion chamber preferably slopes downwardly toward a circular opening or valve seat. Seated within the valve seat is a ball valve, of larger diameter than the valve seat.

It is a feature of this invention that the particular pressure at which the valve is actuated may be varied over a wide range by varying the ball weight in relation to the area of the orifice which is closed by the ball. For systems such as roof structures wherein venting is to be accomplished at low pressure, a lightweight ball, either solid or hollow, may be used and the orifice will be proportionately large. Typical light materials include glass or plastic. To permit venting at higher pressure a heavy ball of steel or the like may be employed with an orifice of proportionately smaller size. Although reference is herein made to a ball valve, it will be understood that other shapes, e. g. conical shapes adapted to fit within and seal the orifice or valve seat may be employed.

Immediately contiguous with and extending generally downwardly from the said valve seat is the valve-arm of a shallow-draft, liquid-containing liquid passage preferably in the form of a U-tube. Preferably the length of the valve-arm will be slightly greater than the thickness of the bottom of the expansion chamber. The lower extremity of the valve-arm joins with a pressure-responsive arm of the U-tube or liquid passage, the latter arm extending laterally upwardly preferably at a flat angle to open into a plenum chamber substantially at or somewhat below the level of the valve seat. Typically, the upper boundary of the pressure responsive arm lies along and may be integral with the underside of the bottom of the expansion chamber. The length of this laterally extending arm preferably will be such that the lower edge of its extremity at the point where the same joins the plenum chamber, will be just slightly above the upper edge of the junction of the pressure-responsive arm with the valve-arm. A conduit or mounting pipe extends from the plenum chamber to the volume wherein pressure may be built up. The mounting pipe may bear a flange at or near its extremity whereby it may be secured to the desired structure to be vented. The liquid passage is filled with a preferably non-volatile liquid, e. g. oil, to a level which preferably is somewhat higher than that of the valve seat, the jointure of the ball and the valve seat being sealed at least in part by the surface tension of the liquid.

The valve of this invention may be adapted to function at slightly higher pressure by increasing the viscosity, the density, or the quantity of liquid placed within the liquid passage. Conversely lower pressure operation may be obtained by decrease of viscosity, density, or quantity of liquid.

In order more clearly to show the operation of the vent valve in combination with a system in which pressure is generated and must be relieved, reference will be hereinafter made to a built-up roof structure. Such a structure may comprise a roof deck providing a gas or vapor impermeable membrane or vapor barrier, and a weather-exposed vapor impermeable membrane or built-up roof superposed on said roof deck. Within the insulating vapor-containing space between these membranes, there may be provided water cut-offs which separate the space into one or more spaces of gas-containing enclosures which are defined by the two vapor barriers and either the water cut-offs or the edges of the roof. Within each of these enclosures the roof may be provided with insulation, preferably in the form of blocks. One or more gas manifolding volumes are disposed within each enclosure whereby expanding gas exiting the porous insulation may be collected. Each such manifolding volume represents a central space which is the terminus of voids in neighboring or surrounding insulation. The manifolding volume may be associated with a reticular system of interconnected channels as disclosed, for example, in copending application Serial No. 482,168, filed January 17, 1955, now U. S. P. 2,833,229 of May 6, 1958. Extending through the roof structure to open into the manifolding volume provided between the membranes is a conduit or mounting pipe providing communication between that volume and the vent valve of this invention and thence to the atmosphere outside of the roof, When such a roof structure, bearing the valve assembly of this invention, is subjected to the heat of direct sun with resultant heating of the roof membrane and of the porous material beneath it, gases (air and water vapor) expand and flow toward the manifolding volume and thence by way of the conduit or mounting pipe into the plenum chamber in the valve assembly. The expanding gases exert a force on the liquid in the plenum chamber which may first act to overcome the force of the surface tension of liquid at the jointure of the ball and valve seat. Typically, when the pressure within the plenum chamber has reached one-eighth inch to three-eighths inch of water, it will open a 0.5 inch nylon ball valve seated on a seat 0.25 inch in diameter.

The expanding gases may displace liquid from the plenum chamber and liquid passage. Simultaneously the liquid level within the expansion chamber rises in accordance with the pressure differential. The ball valve may be raised as the displaced liquid passes into the expansion chamber. The preferably large area of the expansion chamber as compared with the area of the plenum chamber permits any liquid accumulation therein to be effected with build-up of minimum back pressure. When the liquid level in the liquid passage has been depressed to a point at least as low as the upper edge of the junction of the valve-arm and the pressure-responsive arm, the expanding gases pass under this upper edge, through the open valve and the liquid in the expansion chamber, and thence into the atmosphere. Thus pressure developed within the structure may readily be relieved by use of this invention whereby the distortive or disruptive pressures resulting from formation and expansion of gases within the structure cannot occur.

When the roof structure is cooled, as occurs for example during the hours after the sun has gone down, residual gas or vapor within the roof structure decreases in volume and pressure. Under these conditions, the differential in pressure will be reversed and the oil remaining within the expansion chamber will aid in maintaining a tight seal between the valve and its seat whereby gas or vapor is prevented from passing through the valve assembly back into the roof. Thus as the roof cools, air cannot gain access to the insulation within the roof. In fact, after cooling of the previously heated roof, contraction of the residual gases within the porous material results in a positive pressure being applied against the outer weather surface of the membrane which tends to hold that member against the supporting structure, this pressure augmenting the effect of bonding material employed.

When, as is desirable, the porous material is bonded by adhesive to the roof deck (or to a vapor barrier disposed over the deck), or to the roofing membrane, the manifolding volume may be provided by leaving a blank or open area in the adhesive, and the venting conduit inserted through the appropriate structure to terminate within that area and between the upper and lower faces of the adhesive. Such manifolding volumes may be conveniently provided (as disclosed in copending application Serial No. 482,168, filed January 17, 1955, now U. S. P. 2,833,229 of May 6, 1958), by applying the adhesive material, for example a bitumen, to the surface defining the lower boundary of the manifolding spaces, such as the deck, vapor barrier, or porous material, in separated strips of suitable width. Any desired number of the vents may then terminate within each of the spaces between adjacent strips. For venting of the maximum quantity of gas with minimum pressure development within the porous material and surrounding structure, it is preferred to apply the adhesive in discontinuous separate areas or strips, for example as a series of squares or rectangles and to insert vent conduits in a desired number of the areas formed by the intersection of the lateral and longitudinal spaces between the separated areas of adhesive.

Alternatively, the manifolding volume may be provided at least in part within the porous material as by leaving or making a suitable opening between adjacent pieces of the same or in one surface thereof.

In construction of this roof, the manifolding volume may be either below or above the porous material and the vent discharge may be either above or below the roof proper. In constructing a new roof it is preferrd, however, in the interest of simplicity and to avoid undue exposure to the elements of the vent and of the valve structure, if present, to insert the conduit through the roof deck to terminate below it and in a manifolding volume below the insulating layer. When insulation or new membrane or both are being applied to an existing roof structure, it may be more economical and convenient to have the vent conduits communicate between manifolding volumes provided adjacent to or in the upper surface of the porous material and the atmosphere above the roof.

In the accompanying drawings, Figure 1 represents in section the combination of an existing roof construction containing the vent valve in accordance with this invention.

Figure 2 represents in section the combination of the vent valve of this invention and a new roof.

Figure 3 represents a section through line 3—3 of the valve of Figure 2.

According to one of its specific embodiments, this invention may be employed in connection with an existing built-up roof which may or may not be insulated. Figures 1 and 2 of the drawing show the valve in combination respectively with a pre-existing and a new insulated roof structure. Roof deck 10, which may be made of wood, concrete, or other structural material, is covered with an impermeable vapor barrier 11 composed of a plurality of alternating layers of bitumen 12 and felt 13.

Resting on top of vapor barrier 11 are respectively a layer of porous insulating material 15 and a vapor impermeable built-up roofing membrane generally designated 18, formed from a plurality of alternate layers of felt 20 and bitumen 19, and surfaced with a layer 24 of gravel, slate, or other mineral surfacing. Insulation 15 may preferably be a plurality of blocks of cork or other suitable porous insulating material having adequate strength to support the overlying structure. At intervals over the area of the roof, there may also be a plurality of water cut-offs (not shown) extending between the vapor barrier 11 and the impermeable built-up roof 18, dividing the roof into a plurality of square or rectangular sections and forming within each section an enclosed space or volume which is impermeable to passage of gas, air, or other vapors.

The built-up roofs of the drawings may be modified in accordance with this invention by provision therein, within the confines of each square or rectangular section defined by the vapor barriers, of at least one vent valve.

According to the embodiment shown in the drawings, the vent valve, which is adapted to be employed e. g. in connection with the hereinbefore described existing built-up roof, comprises a body structure generally designated 25. Within this body structure 25, there is contained a preferably vertically extending, wide expansion chamber 26 joined at the bottom thereof by a liquid passage 28 to the lower portion of a preferably vertically extending plenum chamber 27. Expansion chamber 26 bears, preferably at an upper portion thereof, a cap 31 containing filter element 32. The bottom 45 of expansion chamber 26 slopes downwardly and preferably is of inverted conical form having its lowest point at the center. An opening 46 at the lowest point of bottom 45 forms a valve seat.

Liquid passage 28 joins expansion chamber 26 at the lowest point of the latter. The liquid passage 28 extends downwardly a distance at least as far as the thickness of the bottom wall 45 of the chamber 26, to form a preferably short, generally vertically extending valve-arm 29. Liquid passage 28 courses upwardly from a lower point of valve-arm 29, preferably in an oblique or lateral direction to form pressure-responsive arm 30 which joins with plenum chamber 27 preferably in the lower portion of the latter, and preferably at or somewhat below seat level. Liquid passage 28, including valve-arm 29 and pressure-responsive arm 30, has the general configuration of a shallow-draft U-tube.

Seated at the upper end of valve-arm 29 at the point at which it joins expansion chamber 26 is ball 33. Preferably of spherical shape, the ball 33 may be fabricated of nylon, polyethylene, cellulose acetate, aluminum, steel or other suitable material. Liquid passage 28 contains a non-volatile liquid, e. g. preferably a high boiling oil. Glycerine, ethylene glycol, or silicone oils may be employed. The properties e. g. density or viscosity of the oil may be chosen to permit operation of the system at the desired pressure. Preferably this liquid is present in quantity sufficient to completely fill passage 28, and to seal the valve seat 46 on which the ball valve 33 rests. The quantity of liquid present may be modified to permit operation under various actuating pressures. The level 44 in expansion chamber 26 will preferably be just adequate to seal the valve 33. Corresponding level 43 will be maintained in plenum chamber 27. In the embodiment of Figure 1, the conduit 38 extends upwardly into plenum chamber 27 and thereby decreases the effective cross-sectioned area thereof. Thus the desired liquid seal is provided with a minimum amount of liquid. A dummy insert or collar may be mounted within the plenum chamber 27 of Figure 2 to decrease the cross-sectional area to desired extent.

The valve assembly 25 is joined to the roof by means of a mounting pipe 34 which connects the upper portion of plenum chamber 27 with the manifolding volume comprising the insulation space between the built-up roof 18 and the vapor barrier 11.

In the embodiment of Figure 1, the mineral surfacing or gravel 24 of the roof may be removed over an area of 2-4 ft. in diameter as by spudding the same. The built-up roof membrane 18 is perforated by drilling a hole therein of diameter equal to or just slightly greater than the outside diameter of mounting pipe 34, typically 0.75 inch to 2.5 inches, say one inch in diameter, and somewhat into but preferably not entirely through insulation 15. The mounting pipe 34 is fitted within the perforation 17 so that the flange 35 rests on membrane 18, and the lower end of the pipe 34 lies within the manifolding volume represented by the hole 17 in the insulation 15. Preferably a bituminous layer is applied between flange 35 and membrane 18. A plurality of layers of felt 23 and bitumen 22 are then employed to completely seal the pipe 34 to the upper surface of the built-up roof 18. Mineral surfacing 24, such as gravel, may then be deposited on top of the flashed flange.

When mounting pipe 34 is firmly secured to the roof in the manner indicated, the body of the vent valve 25 may be affixed thereto. A gasket 37 may be placed on bushing flange 36 (shown as integral with mounting pipe 34). Threaded opening 42 in the lower portion of the plenum chamber of the valve may be screwed onto mounting pipe 34 and tightened so that a water-tight seal is formed at the junction of the plenum chamber 27 and the mounting pipe 34. In the embodiment of Figure 1, the mounting pipe extends sufficiently far into the plenum chamber 27 so that it terminates above the point at which the pressure-responsive arm 30 of liquid passage 28 joins plenum chamber 27. A plug 39 may close the threaded opening 40 in the upper portion of plenum chamber 27.

Although when the vent valve of this invention is employed in combination with an already existing built-up roof as shown in Figure 1, it may be preferable to mount the valve on the upper or weather side of the roof (properly protected as by cover from the elements), it may be found to be more desirable in case of new roofs to mount the valve beneath the roof. Construction of a new roof structure in accordance with this embodiment of the invention is typified by Figure 2 of the drawing. As set forth therein, structural roof deck 10, made of concrete, wood, etc., supports lower vapor barrier 11 made of alternate strips of bitumen 12 and felt 13. This barrier supports insulating layer 15, preferably formed from a plurality of insulation blocks meeting along their edges 16, and built-up roof-membrane 18 composed of alternate layers of felt 20 and bitumen 19, superimposed on top of which is mineral surfacing 24. Mounted within the roof, with its flange 35 resting upon roof deck 10 to which it is flashed, is mounting pipe 34. Preferably, this pipe 34 terminates within opening 14 in the bitumen 12 which forms the lower vapor barrier. In the embodiment of Figure 2, mounting pipe 34 is secured at its lower end to threaded opening 40 in the upper portion of the plenum chamber 27. Opening 42 in the lower portion of plenum chamber 27 may be closed by plug 41.

In the embodiment of Figure 2, the manifolding volume is provided below the porous insulating material 15 and within the layer of adhesive or bitumen with which the insulation is bonded to the vapor barrier 11. This may be accomplished by depositing bitumen upon the uppermost layer of felt 13 of vapor barrier 11 in a plurality of spaced interrupted strips to leave open spaces or channels between the sides of the mopped areas or strips. A plurality of insulating blocks, e. g. cork boards, with edges abutting may be placed on top of the channel-mopped strips of bitumen 12, the spacing between these strips and the size and position of the insulating blocks 15 being such that the bitumen does not seal the openings 16 between the abutting edges or faces in order to facilitate flow of expanding gases or generated vapors from each individual block into the manifolding volumes. With an insulating layer two inches thick made of two feet by four feet cork board, adequate manifolding space is provided when each board is mopped completely except for a margin of three inches at each side. With this mopping, adequate venting of the roof may be obtained by provision of one valve assembly for each 2500 square feet of roof. The mounting pipes 34 will be mounted in the roof so that the extremity thereof will fall in the area 14 at the intersection of two or more unmopped channels between the mopped strips.

It will be understood that the number and spacing of the vents, as well as the location and spacing of the manifolding volumes employed in either a new or an existing roof structure may vary, depending upon the nature of the insulating material used, its thickness, porosity, whether or not it be laid as a continuous layer or as slabs and, if the latter, their dimensions. When practice of the invention involves application of insulation to either a new or existing roof, manifolding volumes may conveniently be supplied adjacent to both the upper and lower surfaces of the layer of insulation by application of spot or channel mopping, preferably with the upper and lower manifolding volumes being interconnected by suitable perforations through the insulation.

In large area roofs, at suitable intervals, vapor-tight partitions or water cut-offs extending from the roof deck or lower vapor barrier through the layer of insulation to the roof membrane or upper vapor barrier divide the insulation into separate sections or compartments. With this construction moisture which penetrates into the insulation by reason of roof damage is prevented from migrating as vapor or liquid to all portions of the insulation. Such partitions (not shown) may be provided, for example, between adjacent slabs of insulating material by one or more layers of felt and bitumen applied to the edge of one of the adjacent slabs to lap over both its upper and lower faces or one of those faces and the opposite face of the adjacent slab. When the compartment construction is used, at least one vent is provided within each compartment in practice of the invention.

It will be apparent to those skilled in the art that various other modifications and changes may be made without departing from the scope of this invention.

We claim:

1. A vent valve adapted to release pressure generated within an enclosed system comprising an expansion chamber having a vent in an upper portion thereof, an orifice-valve seat at the lowest portion thereof, a valve closing member seated on said valve seat and sealing the same, a plenum chamber having an aperture in the lower portion thereof, a shallow-draft liquid-passage having a valve-arm extending generally downwardly from said valve seat and a pressure-responsive arm laterally extending from the said aperture of said plenum chamber joining with said valve-arm at the lower extremity of each of said arms, an opening in one end of said plenum chamber, a conduit fixed in said opening for connecting the portion of said chamber above said liquid-passage with the source of pressure to be released, and a liquid filling said liquid-passage to a level greater than the level of said valve seat whereby the junction of said valve closing member and said valve seat is sealed.

2. A vent valve adapted to release pressure generated within an enclosed system comprising a vertically extending expansion chamber having a vent in an upper portion thereof, an orifice-valve seat at the lowest portion thereof, a valve closing member seated on said valve seat and sealing the same, a plenum chamber having an aperture in a lower portion thereof, a shallow-draft liquid-passage having a valve-arm extending vertically downwardly from said valve seat and a pressure-responsive arm laterally extending from the said aperture of said plenum chamber joining with said valve-arm at the lower extremity of each of said arms, an opening in one end of said plenum chamber, a conduit fixed in said opening for connecting the portion of said chamber above said liquid-passage with the source of pressure to be released, and a liquid filling said liquid-passage to a level greater than the level of said valve seat whereby the junction of said valve closing member and said valve seat is sealed.

3. A vent valve adapted to release pressure generated within an enclosed system comprising a vertically extending expansion chamber having a vent in an upper portion thereof, the bottom of said chamber providing an orifice-valve seat, a ball-valve seated on said valve seat and sealing the same, a plenum chamber having an aperture in a lower portion thereof, a shallow-draft liquid-passage having a valve-arm extending generally downwardly from said valve seat and a pressure-responsive arm laterally extending from the said aperture of said plenum chamber joining with said valve-arm at the lower extremity of each of said arms, an opening in one end of said plenum chamber, a conduit fixed in said opening for connecting the portion of said chamber above said liquid-passage with the source of pressure to be released, and a non-volatile liquid filling said liquid-passage to a level just slightly greater than the level of said valve seat whereby the junction of said ball-valve and said valve seat is sealed.

4. A vent valve adapted to release gas at low developed pressure generated within an enclosed volume and to prevent passage of gas into said volume comprising a housing providing therewithin contiguous expansion and plenum chambers having a common side wall, said expansion chamber being of substantially larger cross-sectional area than said plenum chamber, said chambers terminating at their upper ends at a common end wall of said housing, said plenum chamber extending beyond the lower end of said expansion chamber, an orifice valve seat in said lower end of said expansion chamber, a valve closing member seated on said valve seat, an aperture in said common side wall opening into said expansion chamber and said plenum chamber, a passageway interconnecting said orifice and said aperture and extending generally downwardly from the former and then laterally into the latter, an opening in one end of said plenum chamber, a conduit fixed in said opening for connecting the portion of said chamber above said passageway with the said enclosed volume serving as the source of the pressurized gases to be released, and a liquid filling said passageway to a level greater than the level of said valve seat whereby the junction of said valve closing member and said valve seat is sealed.

5. A vent valve as claimed in claim 4 wherein the opening in the end of the plenum chamber is in the common end wall defining the upper end of that chamber and the upper end of the expansion chamber, and wherein the conduit fixed thereto terminates between the passageway and said common end wall.

6. A vent valve as claimed in claim 4 wherein the opening in the plenum chamber is the lower end wall opposite said common end wall and the conduit fixed in said opening extends within the plenum chamber to terminate between said passageway and said common end wall.

References Cited in the file of this patent

UNITED STATES PATENTS

| | | |
|---|---|---|
| 229,409 | Hickey | June 29, 1880 |
| 934,297 | Englehart | Sept. 14, 1909 |
| 1,093,465 | Otis | Apr. 14, 1914 |
| 1,258,696 | Milligan | Mar. 12, 1918 |
| 1,931,066 | Eckert | Oct. 17, 1933 |
| 2,693,198 | Heath | Nov. 2, 1954 |